United States Patent Office

2,704,746
Patented Mar. 22, 1955

2,704,746

BUTYLATED HYDROXYANISOLE FLAKES

Joseph A. Chenicek, Bensenville, Ill., assignor to Universal Oil Products Company, Chicago, Ill., a corporation of Delaware No Drawing. Application August 16, 1950,
Serial No. 179,882

1 Claim. (Cl. 252—404)

This application more particularly relates to an antioxidant in particle form and to the use thereof.

The use of an antioxidant for the purpose of retarding oxidative deterioration of organic substances is established practice. The use of an antioxidant in food products presents special problems not encountered in the stabilization of other materials. For example, an antioxidant for use in food products must be non-toxic so that it will be officially approved for use and also, to be of full value, should have carry-through properties so that the baked goods will also be stabilized. In addition, the antioxidant must be soluble in the food product and must not impart undesirable color, odor, or taste thereto.

Butylated hydroxyanisole is the trade name given to a mixture of 3-tertiary butyl-4-hydroxyanisole and 2-tertiary butyl-4-hydroxyanisole and this composition is herein referred to in the same manner. This mixture may be prepared in any suitable manner and generally is prepared by the alkylation of hydroxyanisole with isobutylene or tertiary butyl alcohol in the presence of a catalyst such as phosphoric acid.

Butylated hydroxyanisole meets the requirements hereinbefore set forth and has been officially approved for use in food products. The use of an antioxidant is particularly desirable in edible fats and oils which may be of animal, marine, vegetable or mineral origin and include, merely as typical representatives, linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils and fats which are sold under various trade names. It is understood that other oils and fats may be treated within the scope of the present invention, including fats and oils which previously have been subjected to various treatments, such as blowing with air, heat treatment, etc.

Highly refined mineral oil such as Nujol, etc., is utilized for human consumption and, therefore, may be treated advantageously in accordance with the novel features of the present invention. In addition, waxes such as paraffin waxes, vegetable waxes, etc. are utilized in the manufacture of coatings for containers for food products, and, because these waxes undergo oxidative deterioration, it is advantageous to treat them with an antioxidant. Because of the possibility of the waxes contacting the food product, it is desirable that an antioxidant officially approved for use in food products be utilized for this purpose. The antioxidant of the present invention is approved for this purpose and, in addition, offers advantages as compared to the use of an antioxidant as a solution in a solvent. For example, when an oily solvent is utilized, it will tend to sweat out in cases where it is not completely soluble in the wax or it will tend to lower the melting point of the wax in instances where it is soluble.

As hereinbefore set forth, butylated hydroxyanisole is particularly advantageous for use in food products because it serves to extend the shelf life of lard and also has the property of carrying through to the baked goods. Thus, lard containing butylated hydroxyanisole may be stored for a long time without becoming rancid, and crackers, biscuits, potatoes, etc. made with the lard also may be stored for a long time without becoming rancid. Butylated hydroxyanisole is utilized in a concentration of from about 0.0001% to about 1% by weight and more particularly of from about 0.001% to about 0.1% by weight of the organic substances to be stabilized.

Butylated hydroxyanisole is a solid at room temperature and may be marketed as a fused solid product or in a suitable non-toxic solvent, such as a propylene glycol. Marketing of butylated hydroxyanisole as a fused solid product offers some disadvantages in handling and use thereof. For example, it is either necessary to scrape the butylated hydroxyanisole out of the container or to melt the same in order that the butylated hydroxyanisole may be poured from the container. On the other hand, marketing the antioxidant in a solvent offers disadvantages in that the solvent will comprise a substantial proportion of the antioxidant composition, ranging as high as 50–80% of the mixture, and this results in added cost of the solvent and the handling thereof, including freight or other shipping charges entailed in transporting the antioxidant composition. Further the choice of the solvent to be used is limited because the solvent also must meet the requirements of non-toxicity and must not impart undesirable color, odor or taste to the food products. The present invention offers a novel antioxidant which avoids the necessity of using a solvent and also offers the advantage of being in a form which is convenient for applying to the food products.

In one embodiment the present invention relates to solid particles of butylated hydroxyanisole which preferably comprises at least 80% by weight of 3-tertiary butyl-4-hydroxyanisole and not more than 20% by weight of 2-tertiary butyl-4-hydroxyanisole.

In a specific embodiment the present invention relates to a flaked butylated hydroxyanisole comprising at least 80% by weight of 3-tertiary butyl-4-hydroxyanisole and not more than 20% by weight of 2-tertiary butyl-4-hydroxyanisole.

As hereinbefore set forth, while butylated hydroxyanisole is particularly advantageous for use in food products or materials which contact food products, its use as a fused solid or solution offers disadvantages. To offset these disadvantages, the butylated hydroxyanisole may be marketed as solid particles and particularly flakes which will be free flowing and, therefore, readily may be applied to the food product by simply pouring from the container without the necessity of melting the same to make it fluid. However, I have found that the butylated hydroxyanisole must be of a particular composition in order that the particles and flakes will remain free flowing and will not fuse together when stored at a temperature up to about 100° F. Temperatures of 100° F. are encountered in the summer months and also in the hot climate areas. Therefore, as the flakes cannot remain as flakes at temperatures of this order, the butylated hydroxyanisole will fuse and thereby require melting or scraping out in order to be applied to the food products.

I have found that the composition of butylated hydroxyanisole must comprise at least 80% by weight of 3-tertiary butyl-4-hydroxyanisole and not more than 20% by weight of 2-tertiary butyl-4-hydroxyanisole in order that the flaked product will remain as flakes when stored at a temperature of 100° F. As will be shown by the following examples, flakes containing less than 80% by weight of the 3-isomer will fuse together on storage at 100° F.

Butylated hydroxyanisole of the desired composition may be prepared in any suitable manner. In one method, the product formed in the manner hereinbefore set forth is subjected to careful fractionation to separate a particular cut containing at least 80% by weight of the 3-isomer.

The butylated hydroxyanisole prepared as hereinbefore set forth may be formed into flakes in any suitable manner. In one method the butylated hydroxyanisole may be heated to its melting point or preferably slightly higher. This temperature range will generally be of from about 130° to about 160° F. The resultant liquid is then supplied to a conventional flaking machine which generally comprises a revolving drum cooled on the inside by water or other suitable means, whereby the butylated hydroxyanisole is chilled upon contacting and revolving on the drum, and the resultant cake is cut into flakes by a blade positioned at the other end of the drum. The flakes are then collected in any suitable manner and packed into containers for shipment and use.

In some cases the flaking knife may be omitted and the chilled cake may be formed into powder or particles of uniform or irregular size and shape in any suitable manner. The resultant particles may then be utilized in place of the flakes. These particles likewise will remain free flowing and may be added to the food products simply by pouring from the container.

As hereinbefore set forth the specific composition of the 3- and 2-isomers will retain its particle or flaked properties when stored at a temperature of 100° F. for a considerable length of time. However, in some cases the antioxidant will not require this extra protection and, in such cases, it is within the scope of the present invention to utilize, in particle and preferably flaked form, butylated hydroxyanisole of different composition.

The following examples are introduced to illustrate further the novelty and utility of the present invention but not with the intention of unduly limiting the same.

*Example I*

Butylated hydroxyanisole comprising 84% by weight of 3-tertiary butyl-4-hydroxyanisole and the remainder comprising substantially 2-tertiary butyl-4-hydroxyanisole was prepared in the form of flakes as follows: The butylated hydroxyanisole was heated to a temperature of 140° F. and was supplied to a conventional flaking machine, the drum of which was cooled to a temperature of about 50° F. by water circulation through the center thereof. Upon contacting and revolving on the drum the butylated hydroxyanisole was solidified and then was flaked by a blade positioned at the other end of the drum.

Flakes prepared in the above manner were stored at a temperature of 100° F. for 8 months and did not soften or adhere during this storage. The flakes were free flowing and were readily removed from the container by pouring.

*Example II*

Flakes of another butylated hydroxyanisole composition were prepared in substantially the same manner as described in Example I. This butylated hydroxyanisole comprised 79% by weight of 3-tertiary butyl-4-hydroxyanisole and the remainder comprised substantially 2-tertiary butyl-4- hydroxyanisole.

Flakes of the above material were stored at a temperature of 100° F. and after 16 hours the flakes became soft and adhered. The butylated hydroxyanisole could not be removed from the container by pouring and would have to be scraped out or melted. However, these flakes will not soften or adhere when stored at temperatures below about 80° F.

From the above examples it is apparent that the use of a flaked composition containing over 80% by weight of the 3-isomer results in flakes which can be stored at 100° F. for a comparatively long time without the flakes softening and adhering and, therefore, is of particular advantage in cases where storage temperatures of this order are encountered.

I claim as my invention:

Butylated hydroxyanisole in the form of subdivided solid flakes which are free-flowing and non-fusing at 100° F., each of said flakes consisting essentially of 3-tertiary butyl-4-hydroxyanisole and 2-tertiary butyl-4-hydroxyanisole, the first-mentioned compound being in an amount of at least 80% by weight and the amount of the second-mentioned compound not exceeding 20% by weight.

References Cited in the file of this patent

UNITED STATES PATENTS

| | | |
|---|---|---|
| 2,310,710 | Rosenwald et al. | Feb. 9, 1943 |
| 2,459,540 | Rosenwald | Jan. 18, 1949 |
| 2,607,745 | Magoffin | Aug. 19, 1952 |